United States Patent [19]
Pepin

[11] Patent Number: 5,102,723
[45] Date of Patent: Apr. 7, 1992

[54] STRUCTURAL SANDWICH PANEL WITH ENERGY-ABSORBING MATERIAL PIERCED BY RIGID RODS

[76] Inventor: John N. Pepin, Bldg. 4A, Thompson's Point, Portland, Me. 04102

[21] Appl. No.: 434,778

[22] Filed: Nov. 13, 1989

[51] Int. Cl.⁵ .............................. B64D 7/00; B32B 5/12
[52] U.S. Cl. .................................... 428/223; 428/102; 428/120; 428/117; 428/73; 428/193; 428/147; 428/251; 428/252; 428/215; 428/902; 428/911; 89/36.02; 89/36.11; 244/133
[58] Field of Search ................ 428/102, 120, 117, 73, 428/193, 223, 147, 251, 252, 215, 902, 911; 89/36.02, 36.11; 244/133

[56] References Cited

U.S. PATENT DOCUMENTS

| | | | |
|---|---|---|---|
| 1,387,391 | 8/1921 | Hall | 428/223 |
| 2,789,076 | 4/1957 | Frieder et al. | 428/911 X |
| 3,256,130 | 6/1966 | Nisbet et al. | 428/911 X |
| 3,579,411 | 9/1967 | Mackie et al. | 428/223 X |
| 3,837,985 | 9/1974 | Chase | 428/223 |
| 3,841,954 | 10/1974 | Lawler | 428/911 X |
| 3,969,563 | 7/1976 | Hollis, Sr. | 428/911 X |
| 4,179,979 | 12/1979 | Cook et al. | 428/911 X |
| 4,350,728 | 9/1982 | Huang et al. | 428/105 |
| 4,895,063 | 1/1990 | Marlow et al. | 428/911 X |

FOREIGN PATENT DOCUMENTS 2447272 9/1980 France .............................. 428/911

Primary Examiner—Ellis P. Robinson
Assistant Examiner—William P. Watkins, III
Attorney, Agent, or Firm—William Nitkin

[57] ABSTRACT

A lightweight hybrid structural energy-absorbing panel having a plurality of layers of soft energy-absorbing material, such as Kevlar, disposed between facesheets with a plurality of rigid rod members extending between the facesheets through the layers of energy-absorbing material to structurally connect the facesheets, such panel to absorb the energy of ballistic projectiles.

17 Claims, 3 Drawing Sheets

PANEL IMPACT TEST RESULTS

STRUCTURAL SANDWICH PANEL WITH ENERGY-ABSORBING MATERIAL PIERCED BY RIGID RODS

BACKGROUND OF THE INVENTION

1. Field of the Invention

The structure of this invention resides in the field of structural panels and more particularly relates to a hybrid structural panel having energy-absorbing features.

2. Description of the Prior Art

Sandwich panels used in aircraft construction and the like having honeycomb or foam cores with structural facesheets are well known in the art. Such panels offer the advantages of low weight and high stiffness/strength. In applications where high energy fragment protection is also required as in containment of aircraft turbine rotor failures or other energy-absorbing requirements, many layers of Kevlar, polyethylene, glass or other ballistic fabric are usually attached to, or placed against, a panel or reinforced skin structure. Such panels can also be used in other vehicles and fixed structures for protection against weapon projectiles or other high-velocity fragment sources. The design of such panels has not been entirely satisfactory from weight, volume, performance and safety standpoints. For example, the energy-absorbing layers of material are provided as a separate part of the design and occupy a volume apart from the load-bearing structure itself. Also, the energy-absorbing material usually has to be separately encapsulated to prevent absorption of water, oil or other fluids which absorption would reduce the energy-absorbing material's ability to stop high-velocity fragments. This added encapsulation adds further undesired weight. Although some designs may use hard outer surface to blunt impacting projectiles to allow better absorption by the soft ballistic fabric layers, there is little further synergistic effect between the structural, load-bearing part and the energy-absorbing part of these designs.

Reduction of structural weight and volume and improved performance are crucial to efficient design to aircraft structures which must contain high-energy fragments from failed turbine rotors. If these failures are not contained, high-energy fragments can penetrate the engine case wall and can damage critical aircraft systems which lie in their path.

SUMMARY OF THE INVENTION

It is the object of this invention to provide a lightweight sandwich panel structure which is not only capable of supporting structural loads like any other honeycomb or foam cored sandwich panel but which is also capable of absorbing high-velocity projectile or fragment impacts thereby preventing fragment penetration through the panel. This invention accomplishes this goal at minimum weight and volume levels by using a rigid/soft hybrid panel core.

The hybrid panel of this invention allows selected parts of, for example, an airframe to be built with a structure which not only can sustain and support the required airframe loads in normal operation but which also can prevent high-energy fragment penetration should a serious engine failure occur. This panel design minimizes the weight and volume required to perform these dual roles of an airframe structural panel and a containment barrier panel. The hybrid panel of this invention can be used in areas around engines such as cowlings, firewalls or bulkheads or protect critical aircraft components such as fuel tanks, control systems, pressure bulkheads, tail rotor shafts and other engines.

The hybrid panel structure of this invention also can be used for turbine engine containment in ships, boats, land vehicles and hovercraft as many of these vehicles now have turbine power. Auxiliary power units (APU's) and gas generators which supply power to vehicle hydraulic, electrical and other systems also require containment for some installations and would benefit from lightweight, low-volume designs made possible by the use of this hybrid panel. In the future, it is envisioned that advanced turbine engine designs will be made of new materials, have higher rotor speeds and operate at higher temperatures. The safety aspects of operating such engines in sensitive surroundings will continue to dictate that efficient containment structures be used around such engines.

Other applications for my hybrid panel include vehicular armor or other armor needs where lightweight rigid construction is require. Such applications include ships, tanks, troop carriers, buses, automobiles, trains, and other vehicles carrying people or sensitive cargo. Mobile battlefield electronic shelters and other mobile equipment also require lightweight, low-volume panel designs. Still yet another application of the hybrid panel is in space structure for satellites, space stations and the like which must be protected from naturally occurring, as well as man-made, space debris in orbit.

The sandwich panel of this invention is formed of rigid structural facesheets and a hybrid core of rigid rod members which pierce and cross through layers of soft, dry, energy-absorbing material. These rigid crossing members provide the structural connection from one facesheet to the other. When this panel is restrained at its edges and is impacted by high-velocity fragments or projectiles, the high dynamic forces will cause failure of the structural, load-bearing parts, i.e. the facesheets and cross-through members, in the area of impact. At the same time, however, the soft core will stretch to absorb the fragments' kinetic energy and prevent such high-velocity fragments from penetrating through the panel.

DESCRIPTION OF THE PREFERRED EMBODIMENT(S)

Figure 1:
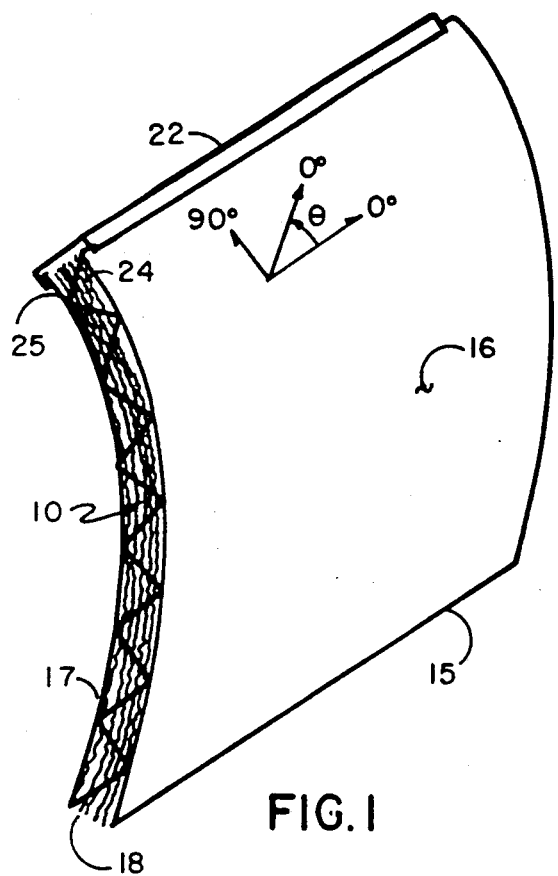
FIG. 1 illustrates a side perspective view of the hybrid structural panel of this invention.

FIG. 1 illustrates a curved panel 15 built of the structure of this invention. It should be understood that a flat panel or a panel of another contour could be used as well. Sandwich panel 15 is comprised of rigid structural facesheets 16 and 17 and a hybrid core 10 of rigid rod members 20 which pierce and cross through layers of soft, dry, energy-absorbing material 18. Rod members 20 provide the structural connection from one facesheet to the other. When the sandwich panel is restrained at its edges and is impacted by a high-velocity fragment or projectile, the high dynamic forces will cause failure of the structural, load-bearing parts, i.e. facesheets 16 and 17 and cross-through rod members 20 in the area of impact. At the same time, however, the soft energy-absorbing material 18 in the core will stretch to absorb the fragment's kinetic energy and prevent the high-velocity fragments from penetrating through the panel.

The soft, energy-absorbing material 18 of core 10 can, in one embodiment, be made of several dry layers of woven ballistic fabric from fibers such as aramid, with Kevlar being one example; polyethylene, with Spectra being one example; and rigid rod polymer fibers such as polybenzbisoxazole (PBO) or polybenzbisthiazole (PBZT) or other equivalent fiber which is lightweight and has fracture modes conducive to absorbing high-velocity fragment energies. Fibers such as glass might also be used to accommodate cost or temperature constraints in specific designs. Dry fabric has been shown to be more effective in absorbing the kinetic energy of high-speed projectiles and fragments than resin-impregnated fabrics. It is known that wetting a dry ballistic panel with water or other fluid seriously impairs its energy-absorbing ability. In use, core 10 can be encapsulated and sealed by fluid-tight structure 22 disposed around its edges, shown on only one side for purposes of illustration, so that core 10 will remain dry for maximum energy-absorbing performance. Other forms of fiber-reinforced ballistic materials such as felt or 3-D woven forms can also be used in energy-absorbing core 10 of hybrid panel 15.

Rigid crossing rod member 20 can be fabricated from any structural material such as aluminum, titanium, stainless steel or other equivalent metal as well as from any number of fiber-reinforced composite materials. Such fiber reinforced composites can include carbon, glass, boron, silicon carbide or other suitable fiber which can reinforce matrix materials such as organic resins, carbon or metals. Examples of such composites are carbon/epoxy, carbon polyimide, carbon-carbon, and metal matrix composites such as silicon carbide/aluminum. If a composite material is used for rigid crossing rod members 20, the fibers should be aligned in the longitudinal, i.e. axial, direction of the member since high strength and stiffness will be required in that direction to transmit panel facesheet forces. A cross-section of the rigid crossing rod member 20 as it penetrates the soft, energy-absorbing part of the core will be close to circular to resist Euler buckling equally in all directions as crossing members are likely to be loaded in compression in many cases. The rigid crossing rod member can be welded, bonded or otherwise attached to the facesheet's inner interfaces, surfaces 24 and 25.

Facesheets 16 and 17 can be made of the same materials as crossing rod members 20 or of other suitable structural plate materials to satisfy a particular need. If the facesheet is made from a composite laminate, the fiber orientations within that laminate are strong functions of the imposed loads to be carried by the panel and its deformation, strength and dynamic behavior requirements. A combination of longitudinal (0 degree), lateral (90 degree), and off-axis ($+/-\theta$ degree) orientations are usually specified taking the loading boundary conditions and panel requirements into account.

The architecture of rigid crossing rod members 20 and relative sizes and thicknesses of the panel's other components will vary depending on the panel's application and loading. For aircraft structure applications, the panel thickness can vary from $\frac{1}{4}$ inch to $2\frac{1}{2}$ inches with facesheet thicknesses from 0.005 inch to 0.100 inch. Rigid crossing member rod diameters can vary from 0.010 to 0.150 inch for an aircraft application. Lighter weight panels would be required for orbiting space structure applications with facesheet and rod dimensions smaller than those shown for aircraft structure. Two or three layer of 0.001 inch thick ordered polymer films or fiber-reinforced composite lamina can be used for some space panel facesheets. The rigid crossing members can be arranged in a series of parallel rows 0.10 inch to 0.50 inch apart alternating 45 degrees and 90 degrees piercing angles from one row to the next. For a square or rectangular panel as shown in FIG. 1, a set of these parallel rows can follow the 90 degree in-plane direction as shown by the axes drawn on the panel facesheet. For ship or land vehicle applications heavier panels with thicker sections may be required.

Figure 2:
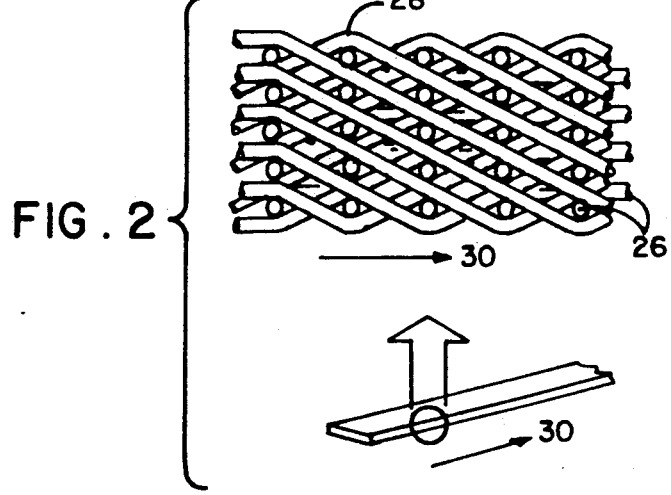
FIG. 2 illustrates a side perspective view of the 3-D woven hybrid core (without facesheets) which forms one embodiment of this invention.
Figure 5:
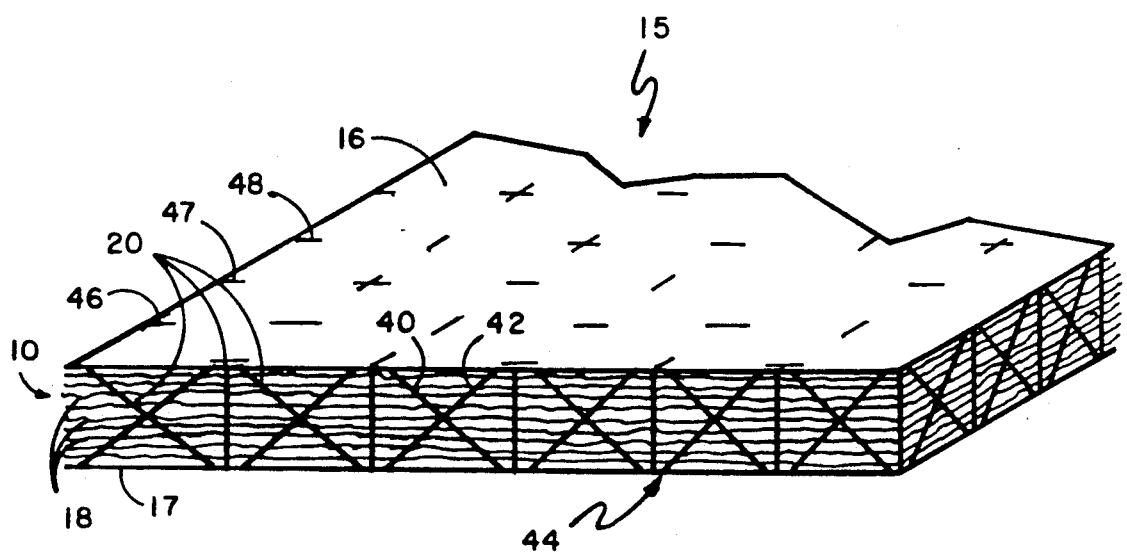
FIG. 5 illustrates a side perspective view of the hybrid structural panel with a different arrangement of rods than the panel of FIG. 1.

The dry energy-absorbing material 18 can be several layers of commercially available ballistic fabric such as Kevlar 29 style 745 which has a weight-per-unit are of 0.1 pounds per square foot. The fabric layers would then be pierced or sewn-through with the rigid rod material or precursor. Other fiber forms such as mats or felts could also be used as the energy-absorbing core. An alternate hybrid core architecture can use 3-D loom woven materials as shown in FIG. 2. In this case the in-plane yarns 26 would act as the energy absorbers while the through-thickness yarns 28 would be precursors to a rigid form capable of acting as structural crossing members. This approach would be limited to $\frac{1}{4}$ inch core thicknesses and crossing members in the warp direction 30 only because of the limitations of current automated equipment. Newly developed weaving equipment may expand these limits in the future. Manually woven 3-D forms would be possible but may be prohibitively expensive for most applications. FIG. 5 illustrates an alternate embodiment of the panel showing a different arrangement of rods disposed at different angles than the panel shown in FIG. 1 which rods in FIG. 5 are in some cases crossing one another as seen by rods 40 and 42. Further rows 44 of rods are disposed in the panel as shown by dotted lines 46, 47 and 48 and following dotted line rows.

EXAMPLE

To determine the ballistic performance effect of the insertion or sewing-through of many rigid crossing members into a dry laminate of energy-absorbing material, test panels representing a baseline, dry fabric laminate and the same laminate with sewn through, rigid rods were impact tested. Titanium projectiles $2'' \times 6'' \times 0.19''$ in dimension were fired from a gas gun at velocities of approximately 550 sheet/second at $12'' \times 18''$ panels inclined 30 degrees to the path of the projectile. The weight per unit area of all panels was similar and the projectile velocity was varied to determine the energy level at which penetration of the panel occurred. High-speed photography documented the impact event/energy absorption mechanisms and the deformation of all the test panels.

Figure 3:
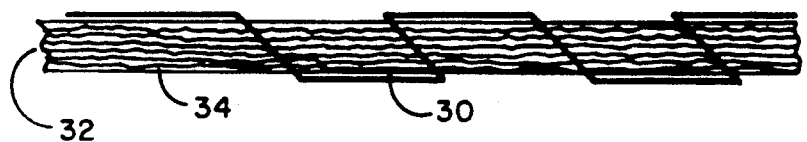
FIG. 3 illustrates a side view of the test panel showing rigid rods at an angle to the dry, energy-absorbing laminate core.
Figure 4:
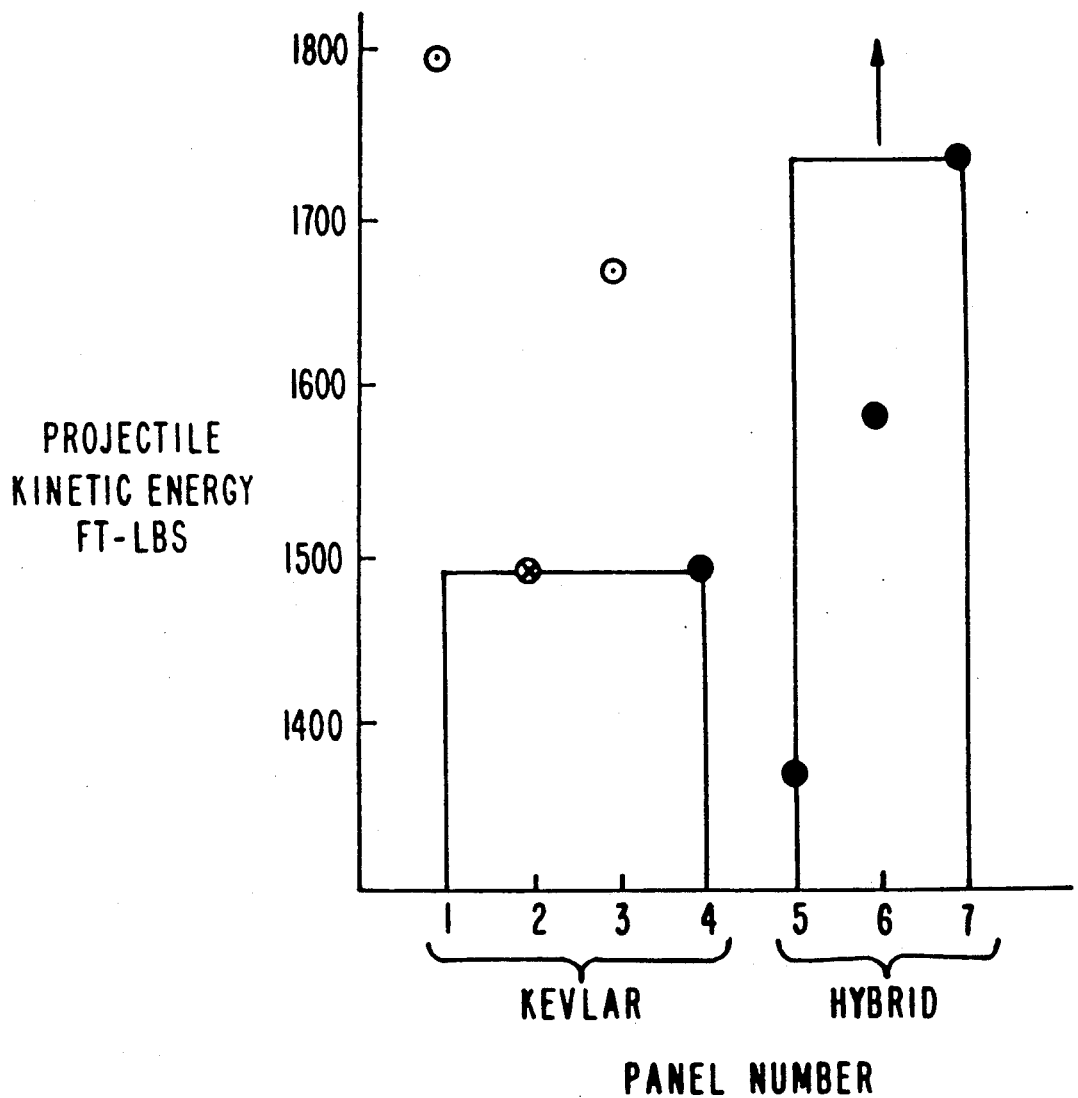
FIG. 4 illustrates a graph of the panel impact test results.

Four baseline panels were constructed by laying nine plies of Kevlar 29 style 745 fabric on top of one another and sewing the edges with a cotton thread just to hold the dry laminate together. The fabric was a plain weave. A $1\frac{1}{2}$ inch width along the 12-inch edges of these 12"×18" panels was impregnated with epoxy resin to allow mounting of these edges in a picture-frame type test fixture. Three hybrid test panels simulated the hybrid panel core structure of this invention in that graphite/epoxy yarns are sewn through the Kevlar fabric plies and the epoxy resin cured to rigidize the sewn cross-through members. FIG. 3 shows a cross-section of the hybrid test panel 24 along a side of the panel. A twelve thousand filament (12K) AS4 graphite yarn 30 preimpregnated with 3501-6 epoxy resin 30 was sewn through Kevlar plies 32 in the pattern shown. A yarn with the same pattern was then sewn parallel to it and so on until the panel was filled to within ½ inch of its edges. These parallel yarns were 0.12" apart. Before sewing, the dry Kevlar laminate was covered with a 0.001" thick Teflon film 34 to prevent epoxy resin from flowing out of the graphite yarn into the Kevlar. Once the panel was sewn with the preimpregnated (prepreg) graphite yarn, the panel was vacuum bag molded between two flat plates to cure the resin and rigidize all the graphite/epoxy yarns. To test these panels, a blade-like titanium projectile impacted the bottom side of the panel and was either not able to penetrate the panel, partially penetrated the panel damaging the top play, or penetrated completely through the panel. These outcomes depended on the kinetic energy of the projectile and the energy-absorbing capability of the panel. Test results are shown in FIG. 4 where the projectile Kinetic energy and test outcome for each panel. The penetration threshold of the Kevlar baseline panels is about 1600 ft-lbs of projectile kinetic energy while the penetration threshold is above 1820 ft-lbs for the rigid graphite/epoxy-soft Kevlar hybrid panel of this invention. It must be stated at this point that the graphite/epoxy rigid crossing yarns add only 8% of the panel weight and that the yarns' energy-absorbing capability alone is very small. The unexpected increase in the energy-absorbing capability of the hybrid panel is due to a synergistic effect between the soft and rigid structures acting in combination to enhance the energy-absorbing capability of each material to yield a superior ballistic panel.

Since the invention is a panel which serves two purposes, the performance of this hybrid panel for each purpose might be expected to be somewhat less than for panels designed specifically for only one of the requirements; i.e. either fragment protection or as a structural member. When the idea for this panel was conceived, it was expected that some compromise in performance in each area would have to be made to design and develop a panel for this dual role. This initially expected compromise seemed reasonable and acceptable for many applications where structural integrity, fragment containment and ballistic projectile protection were required. But, as this initial testing has shown, the assumption of performance losses as a result of use of the hybrid core is not true and, in fact, the opposite is true for the panel's ballistic impact role.

In the first instance, penetration of the soft, energy-absorbing material with many rigid, crossing members might be expected to diminish the capability of the ballistic material to stop high-energy fragments. Initial testing with Kevlar fabric sewn through with graphite/epoxy rods yielded the unexpected result that the ability of the dry Kevlar fabric laminate to stop a high-velocity, blade-like projectile was enhanced by the piecing, through-thickness graphite/epoxy rods. The mechanism responsible for this enhancement is based on two factors, either alone or in combination. The first is that the rigid rod crossing members are holding the weave of the fabric together and the second is that the dry fabric surrounding the rigid crossing member forces tensile failure of the graphite/epoxy rod. The hybrid panel thus has an enhanced ability to prevent penetration of high-energy fragments.

The second issue is the effect of using rod members piercing a dry core to connect the opposing facesheets of the sandwich panel. Structural sandwich panel core configurations usually employ foam, waffle or honeycomb structures for facesheet interconnections. For example, the honeycomb core, with facesheets attached, provides the compression and shear strength necessary to transmit applied loads across from one facesheet to the other. Such panels are strong since the structural facesheets are separated from the panel's neutral axis by the honeycomb core and are also effective in in-plane compression loading because the core acts to stabilize the facesheet to delay buckling until high facesheet loads are reached. In the same way the pattern of crossing rod members of this invention and the support given to them by the dry, energy-absorbing material is designed such that the sandwich hybrid panel can be made of a strength and stiffness comparable to the prior art panels. Unlike the open honeycomb or waffle shell core constructions, the rigid rod crossing members of the hybrid panel core of this invention are surrounded by a dry, compact fabric laminate or other ballistic material and are supported laterally by such material. This lateral support delays the buckling failure of the small, rigid crossing members themselves when they are loaded in compression thereby enhancing the panel's strength and stiffness. The spacing and angle of penetration of these crossing members further simulate the mechanical reaction of other core materials to facesheet loads. For example, the spacing of the crossing members must be close enough to prevent local buckling or dimpling of the facesheet out of its original flat plane. Also, some rigid members can be perpendicular to the facesheet plane to support out-of-plane deformation of the facesheet and compression loads on the facesheet itself while others will be inserted at 45-degree angles to the facesheet to transmit shear loads from one facesheet to the other.

Although the present invention has been described with reference to particular embodiments, it will be apparent to those skilled in the art that variations and modifications can be substituted therefor without departing from the principles and spirit of the invention.

I claim:

1. A structural panel comprising:
   at least one layer of energy-absorbing material capable of absorbing the kinetic energy of high-velocity fragments or projectiles, said material having a top and a bottom surface and said material comprising light weight dry ballistic fibers having no resin impregnation;
   a bottom inner rigid structural facesheet disposed on the bottom surface of said layer;
   a top outer rigid structural facesheet disposed on the top surface of said layer; and
   a plurality of closely spaced rigid rod members attached to and extending from the bottom of the top facesheets piercing through said layer of energy-absorbing material to structurally connect said top and bottom facesheets.

2. The structural panel of claim 1 wherein said material layer includes a plurality of layers of soft, dry, energy-absorbing material characterized by having no resin impregnation disposed between said top and bottom facesheets.

3. The structure of claim 2 wherein said rod members extend through said layers of energy-absorbing material at angles to the facesheets of up to 90 degrees and structurally connect said inner and outer facesheets to one another.

4. The structure of claim 3 wherein said energy-absorbing material layers are selected from the group consisting of woven ballistic fabrics, and felts.

5. The structure of claim 4 wherein said woven ballistic fabrics are selected from the group consisting of aramid, polyethylene, polybenzbisoxazole, polybenzbisthiazole and glass.

6. The structure of claim 3 further including means to seal the edges of said panel fluid tight.

7. The structure of claim 3 wherein said energy-absorbing material layers and rods are in a 3-D woven form having in-plane yarns and cured resin impregnated through-thickness yarns with said absorbing layer comprising said in-plane yarns and said rods comprising said through-thickness yarns.

8. The structure of claim 3 wherein said facesheets are selected from the group consisting of metals, ceramics and composite laminates.

9. The structure of claim 8 wherein said panel is 0.25-2.50 inch(es) in thickness and said inner and outer facesheets are each 0.005-0.100 inch in thickness.

10. The structure of claim 3 wherein said rods are 0.010-0.150 inch in typical cross-section dimension.

11. The structure of claim 3 wherein said facesheets are each comprised of a layer of 0.001 inch thick material selected from the group consisting of ordered polymer films and fiber-reinforced composites.

12. The structure of claim 3 wherein said rods are spaced apart 0.10-0.50 inch from one another and extend in alternate rows, one row being at angles of 45 degrees and the other row at angles of 90 degrees from the facesheets.

13. The structure of claim 3 wherein said rods are made of material selected from the group consisting of aluminum, titanium, stainless steel, metals, ceramic, fiber-reinforced composite materials including composite materials with metal, ceramic or organic matrices.

14. The structure of claim 13 wherein said fiber-reinforced composite materials are reinforced by materials selected from the group consisting of carbon, glass, boron silicon carbide and alumina.

15. The structure of claim 13 wherein said composite material is selected from the group consisting of carbon fiber reinforced epoxy resin composite, carbon fiber reinforced polyimide resin composite, carbon-carbon, and metal matrix composites including silicon carbide reinforcing an aluminum matrix.

16. The structure of claim 3 wherein said rods are initially forced of graphite fiber reinforced epoxy resin composite precursor which is cured or otherwise made rigid after positioning in said structure.

17. The structure of claim 3 wherein said rods are approximately circular in cross-section.

* * * * *